US008493610B2

(12) United States Patent
Kitagawa et al.

(10) Patent No.: US 8,493,610 B2
(45) Date of Patent: Jul. 23, 2013

(54) IMAGE READING METHOD AND IMAGE READING APPARATUS

(75) Inventors: Kan Kitagawa, Yokohama (JP); Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 12/715,527

(22) Filed: Mar. 2, 2010

(65) Prior Publication Data

US 2010/0231984 A1 Sep. 16, 2010

(30) Foreign Application Priority Data

Mar. 12, 2009 (JP) .................................. 2009-060113

(51) Int. Cl.
*H04N 1/405* (2006.01)

(52) U.S. Cl.
USPC ......................................... 358/1.18; 358/522

(58) Field of Classification Search
USPC ...... 358/1.9, 2.1, 3.01, 3.14, 1.18, 3.05–3.06, 358/522, 468, 400, 500
See application file for complete search history.

(56) References Cited

U.S. PATENT DOCUMENTS

| 5,729,627 | A | 3/1998 | Mizuno et al. ................ 382/173 |
| 6,625,312 | B1 * | 9/2003 | Nagarajan et al. ............ 382/176 |
| 6,633,411 | B1 * | 10/2003 | Rao et al. ........................ 358/2.1 |
| 2011/0141525 | A1 * | 6/2011 | Ng et al. ...................... 358/3.06 |

FOREIGN PATENT DOCUMENTS

| JP | 3183787 B2 | 7/2001 |
| JP | 3726439 B2 | 12/2005 |

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

This invention is made to solve the problem that the conventional method cannot correctly determine whether an original is a halftone. To solve this, a method according to this invention detects, from an original, first and second feature pixels respectively exhibiting first and second features. A first feature pixel to first feature pixel distance and second feature pixel to second feature pixel distance are calculated from neighboring first feature pixels and neighboring second feature pixels, respectively. The average of the first feature pixel to first feature pixel distance and the neighboring second feature pixel to second feature pixel distance is calculated as a feature pixel to feature pixel distance. A histogram is generated by the appearance count of only a feature pixel to feature pixel distance for which the same value successively appears. Whether the read original is a halftone is discriminated based on this histogram.

8 Claims, 8 Drawing Sheets

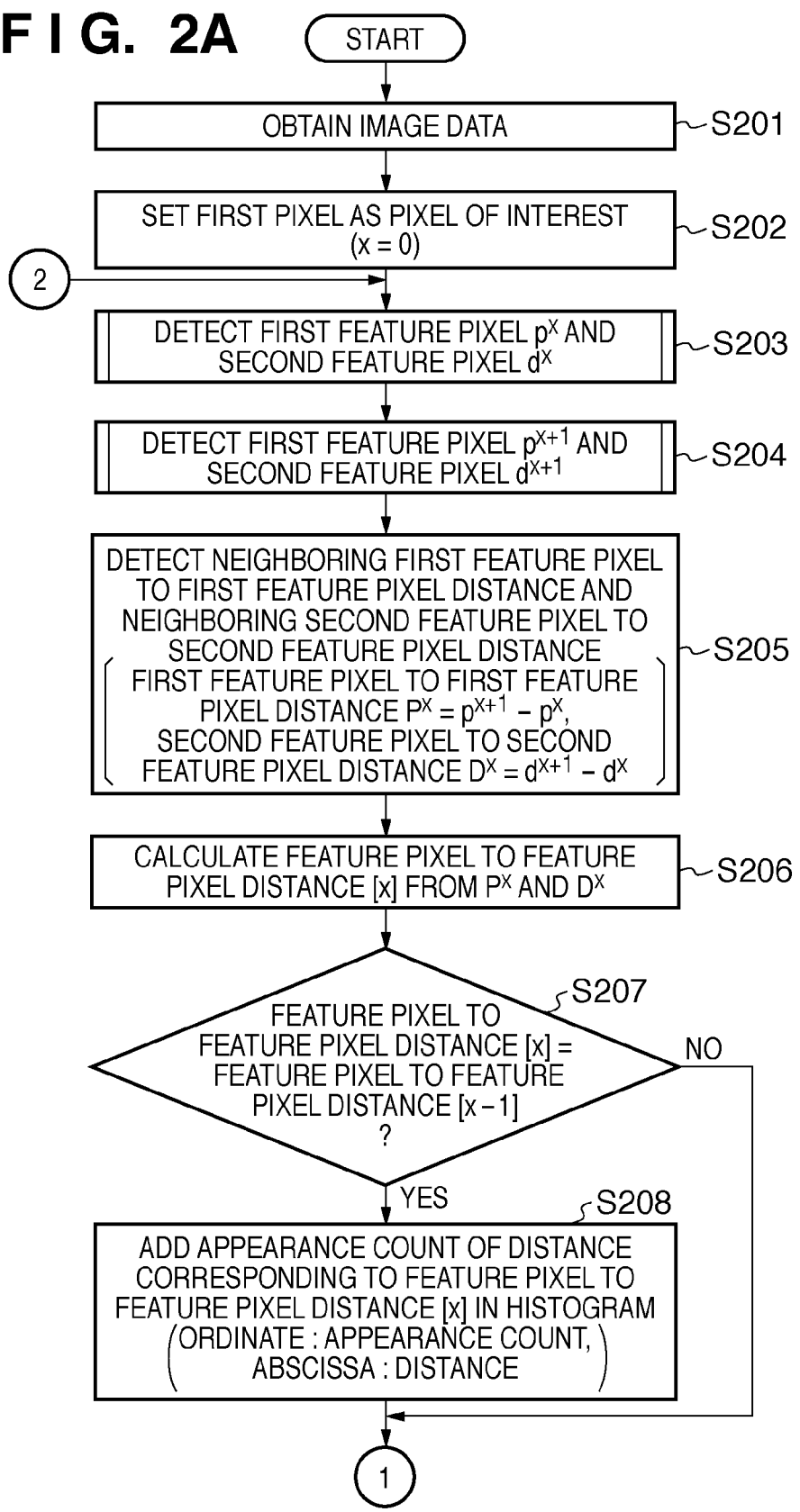

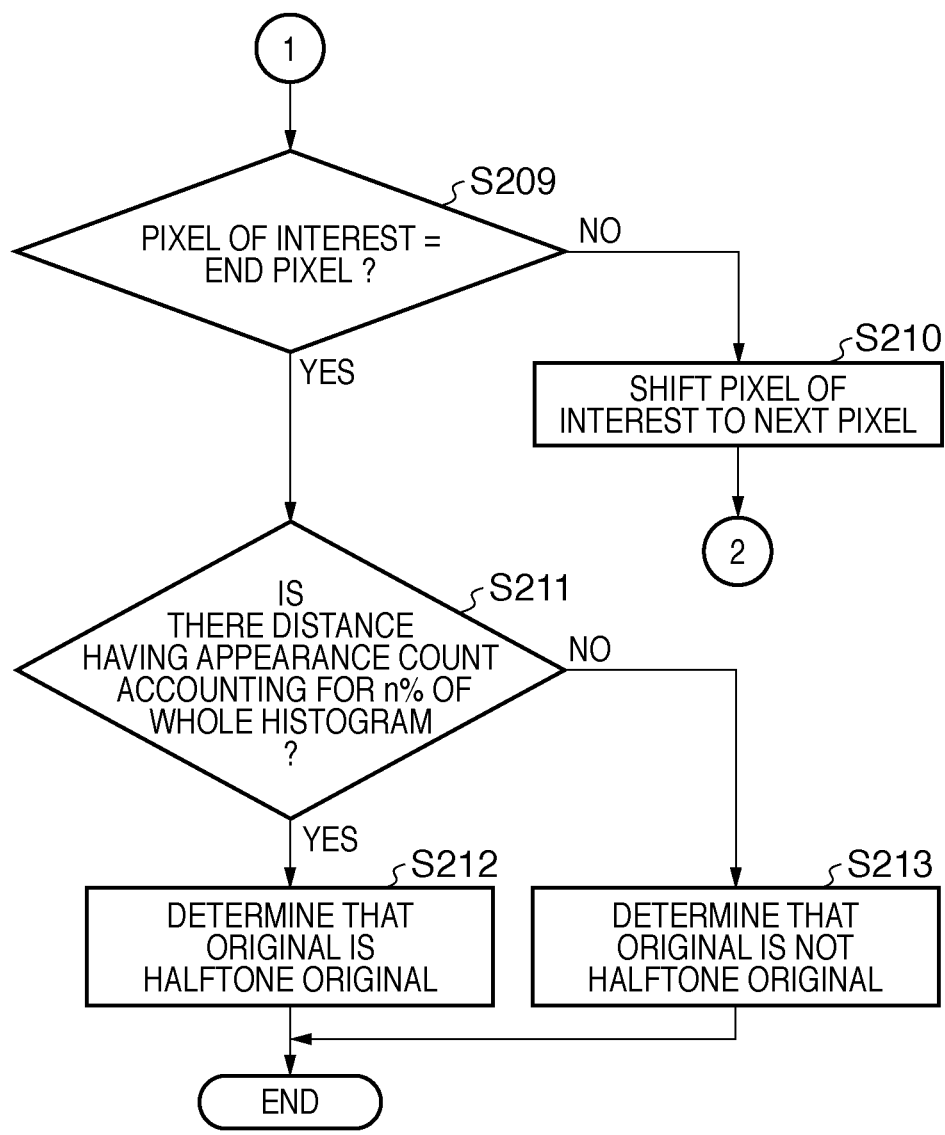

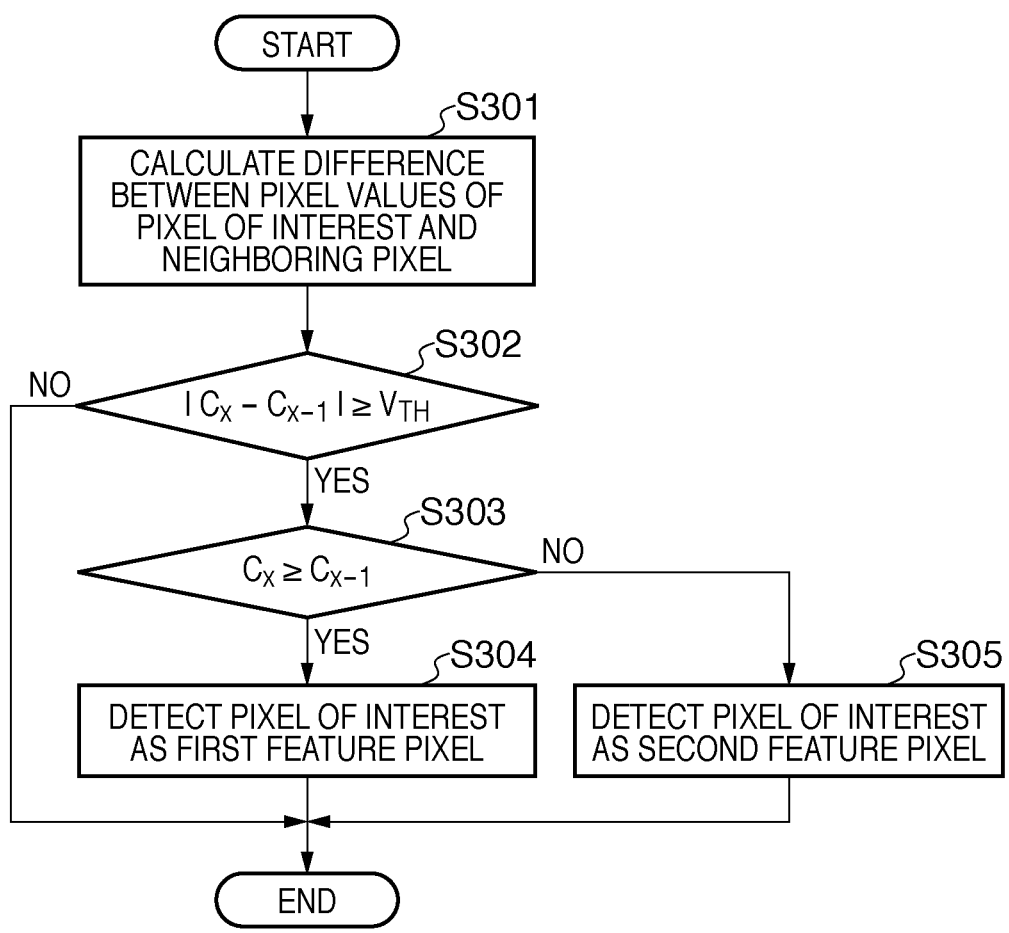

IMAGE READING METHOD AND IMAGE READING APPARATUS

BACKGROUND OF THE INVENTION

1. Field of the Invention

The present invention relates to an image reading method and image reading apparatus for discriminating whether or not image data obtained from an image original contains a region represented by halftone dots.

2. Description of the Related Art

When generating image data by using an image reading apparatus such as a scanner, interference fringes called moire sometimes appear in the generated image data due to the halftone dot location periodicity if an original to be read contains a photograph or figure represented by halftone dots. The occurrence of moire is suppressed by using a method by which after an original is read with a high resolution, smoothing processing is performed, and the image data is resized to the desired resolution.

Unfortunately, this method has the problem that the smoothing processing is applied to a portion such as the outline portion of a character to which it is originally undesirable to apply the processing. When successively reading a plurality of originals, therefore, the user must switch the setting for each original by determining whether or not the original contains a halftone dot region. This significantly decreases work efficiency. Accordingly, it is extremely important to establish a method of automatically discriminating whether or not an original image contains a halftone dot region, and increase the accuracy of the discrimination.

As a method of discriminating whether or not image data generated by an image reading apparatus contains halftone dots, a method that performs the discrimination by using feature pixels characteristically appearing in a halftone original has conventionally been proposed. An example of the generally used conventional techniques is a method that detects, from an image, a peak pixel having a high value as a component of interest, such as the density, with respect to adjacent pixels, and determines whether or not the target original is a halftone original based on a value calculated by using the peak pixel.

A method of discriminating a halftone original by referring to a peak pixel is disclosed in, for example, Japanese Patent No. 3,726,439. In this method, a pixel set including a peak pixel and its adjacent pixels (e.g., 3×3 pixels) is regarded as one block in target image data of a few lines, and whether the target original is a halftone original or not is determined by comparing features such as the density of the block with that of a known pattern. Another method is disclosed in Japanese Patent No. 3,183,787. This method calculates the distance between neighboring peak pixels as a peak pixel to peak pixel distance, and determines that image data is a halftone original if a specific peak pixel to peak pixel distance frequently appears in the image data.

Unfortunately, a method of calculating the distance between pixels characteristically indicating a halftone dot portion, such as the peak pixel to peak pixel distance used in Japanese Patent No. 3,183,787, and discriminating whether or not target image data is a halftone original based only on the appearance frequency has the following problem. That is, the accuracy of the discrimination is low because a feature pixel to feature pixel distance detected from a region other than a halftone dot region in an original is also taken into consideration for the determination.

In addition, even when the feature pixel to feature pixel distance of a halftone dot is constant on an original, the feature pixel to feature pixel distance is not always constant on image data depending on a combination of the number of lines of the original and the read resolution, and a high appearance frequency sometimes appears on two distances. As a consequence, a distance having a very high appearance frequency cannot be sensed, so the image data is not discriminated as a halftone original.

SUMMARY OF THE INVENTION

Accordingly, the present invention is conceived as a response to the above-described disadvantages of the conventional art.

For example, an image reading method and image reading apparatus according to this invention are capable of accurately discriminating a halftone image.

According to one aspect of the present invention, there is provided an image reading method of reading an image of an original by an image reading apparatus, comprising: a comparing step of comparing a value of a pixel of interest with that of a neighboring pixel of the pixel of interest, the pixel of interest being each pixel in image data corresponding to pixels arranged in a predetermined direction of the original; a first detecting step of detecting, as a first feature pixel, a pixel of interest having a value exhibiting a first feature compared to the value of a neighboring pixel, based on the comparison result in the comparing step; a second detecting step of detecting, as a second feature pixel, a pixel of interest having a value exhibiting a second feature compared to the value of a neighboring pixel, based on the comparison result in the comparing step; a first calculating step of calculating a first feature pixel to first feature pixel distance between neighboring first feature pixels detected in the first detecting step; a second calculating step of calculating a second feature pixel to second feature pixel distance between neighboring second feature pixels detected in the second detecting step; a third calculating step of calculating a feature pixel to feature pixel distance based on the first feature pixel to first feature pixel distance and the second feature pixel to second feature pixel distance; a histogram generating step of generating, from the feature pixel to feature pixel distances calculated from all pixels arranged in the predetermined direction, a histogram of a feature pixel to feature pixel distance having the same value in succession; a discriminating step of discriminating whether or not a feature pixel to feature pixel distance exceeding a predetermined frequency exists in the histogram; and a determining step of determining whether or not the original is a halftone original, based on the discrimination result in the discriminating step.

According to another aspect of the present invention, there is provided a computer readable medium which stores a computer program to be executed in a computer, the computer program comprising the steps recited in the above method.

According to still another aspect of the present invention, there is provided an image reading apparatus comprising: a scanner unit configured to read an image of an original; a comparison unit configured to compare a value of a pixel of interest with that of a neighboring pixel of the pixel of interest, the pixel of interest being each pixel in image data corresponding to pixels arranged in a predetermined direction of the original; a first detection unit configured to detect, as a first feature pixel, a pixel of interest having a value exhibiting a first feature compared to the value of a neighboring pixel, based on the comparison result from the comparison unit; a second detection unit configured to detect, as a second feature pixel, a pixel of interest having a value exhibiting a second feature compared to the value of a neighboring pixel, based on the comparison result from the comparison unit; a first calculation unit configured to calculate a first feature pixel to first feature pixel distance between neighboring first feature pixels detected by the first detection unit; a second calculation unit configured to calculate a second feature pixel to second feature pixel distance between neighboring second feature pixels detected by the second detection unit; a third calculation unit configured to calculate a feature pixel to feature pixel distance based on the first feature pixel to first feature pixel distance and the second feature pixel to second feature pixel distance; a histogram generation unit configured to generate, from the feature pixel to feature pixel distances calculated from all pixels arranged in the predetermined direction, a histogram of a feature pixel to feature pixel distance having the same value in succession; a discrimination unit configured to discriminate whether or not a feature pixel to feature pixel distance exceeding a predetermined frequency exists in the histogram; and a determination unit configured to determine whether or not the original is a halftone original, based on the discrimination result from the discrimination unit.

The invention is particularly advantageous since whether or not an original is a halftone original can be determined based on a histogram calculated by using a feature pixel to feature pixel distance having the same value in succession, from a plurality of kinds of feature pixel to feature pixel distances. This makes it possible to perform the determination based on the stable feature pixel to feature pixel distance regardless of the feature pixel to feature pixel distance of one feature pixel, and accurately discriminate a halftone original.

Further features of the present invention will become apparent from the following description of exemplary embodiments (with reference to the attached drawings).

BRIEF DESCRIPTION OF THE DRAWINGS

FIGS. 2A and 2B are flowcharts showing a halftone original discrimination process according to the embodiment of the present invention.

FIG. 3 is a flowchart showing details of the process of detecting first and second feature pixels according to the first embodiment of the present invention.

DESCRIPTION OF THE EMBODIMENTS

An Exemplary embodiment of the present invention will now be described in detail in accordance with the accompanying drawings. Note that embodiments to be explained below do not limit the present invention, and not all features of the embodiments to be explained below are essential to the present invention.

Figure 1:
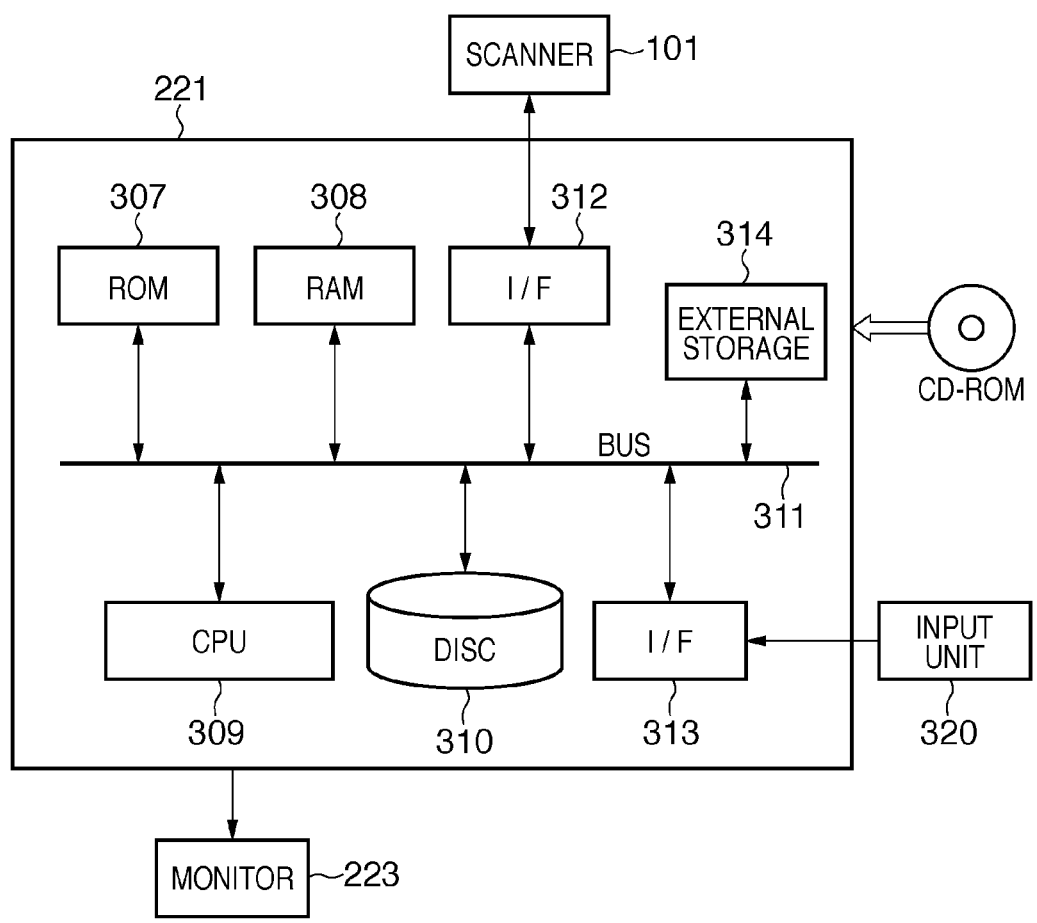
FIG. 1 is a block diagram showing an outline of the arrangement of an image processing apparatus for use in the control and image processing of a scanner (image reading apparatus) as a typical embodiment of the present invention.

FIG. 1 is a block diagram showing an outline of the arrangement of an image processing apparatus for use in the control and image processing of a scanner (image reading apparatus) as a typical embodiment of the present invention. This image processing apparatus is implemented by executing a control program (to be described later) on a general personal computer (PC).

As shown in FIG. 1, a PC 221 includes a ROM 307, RAM 308, CPU 309, disk device 310, bus 311, scanner interface (I/F) 312, external input interface (I/F) 313, and external storage 314. The ROM 307 holds the control program (to be described later). The RAM 308 is used as a work area necessary for the operation of the control program. The CPU 309 reads out the control program held in the ROM 307 and executes the readout program, thereby performing an image read control process.

The bus 311 connects the above-mentioned constituent elements and exchanges data between them. The scanner interface 312 complies with the USB interface specification and communicates with a scanner 101. The scanner 101 also has an interface complying with the same specification. Note that this interface may also be an interface complying with another specification such as IEEE 1394. The external input interface 313 connects to an input unit 320 including, for example, a pointing device and keyboard.

The external storage 314 uses an external storage medium such as a flexible disk or CD-ROM as a storage medium. When the control program is stored in the external storage medium, the external storage 314 reads out the control program and installs it in the PC 221. Note that it is also possible to download the control program across a network by using a network connection (not shown).

The PC 221, having the above arrangement, is connected to the scanner 101 and a monitor 223 such as an LCD. When reading an image from an original set on the scanner 101, the user performs operations necessary for image read by using the monitor 223 and input unit 320.

Note that the arrangement shown in FIG. 1 is an example in which the scanner and the image read controller implemented in the PC are separated, but the present invention is not limited to this arrangement. For example, the present invention is also applicable to an apparatus called a multifunction printer (to be referred to as a MFP hereinafter) in which a scanner function and printer function are integrated. In this case, a controller including a CPU in the MFP performs image processing on image data generated by reading an original by a scanner unit of the MFP. This is particularly applied to a case in which the MFP functions as a copying machine.

Embodiments of a halftone original discrimination process executed in an image reading system including the PC and scanner having the above-mentioned configurations or MFP will be explained below.

[First Embodiment]

FIGS. 2A and 2B are flowcharts showing the halftone original discrimination process according to the embodiment of the present invention.

First, in step S201, the scanner reads an image original and obtains image data of one line. Then, in step S202, a pixel of interest is determined in the image data of one line obtained in step S201. Note that the first pixel of the image data is set as a pixel of interest immediately after the image data of one line is received, and a pixel following the preceding pixel of interest is set as a pixel of interest when repeating the processing after that. Note that the position of each pixel in the line direction is represented by an x-coordinate value, and the position of the first pixel is x=0. Accordingly, the position of a pixel of interest is generally represented by "x".

In steps S203 and S204, first and second feature pixels are detected from the image data obtained in step S201. In this embodiment, the density value of each pixel is calculated, and a pixel having a density value larger by at least a predetermined value than that of a neighboring pixel is set as the first feature pixel, and a pixel having a pixel value lower by at least the predetermined value than that of a neighboring pixel is set as the second feature pixel. Note that it is also possible to use, for example, an RGB brightness value, instead of the density value, as the pixel value.

FIG. 3 is a flowchart showing details of the process of detecting the first and second feature pixels.

Figure 4:
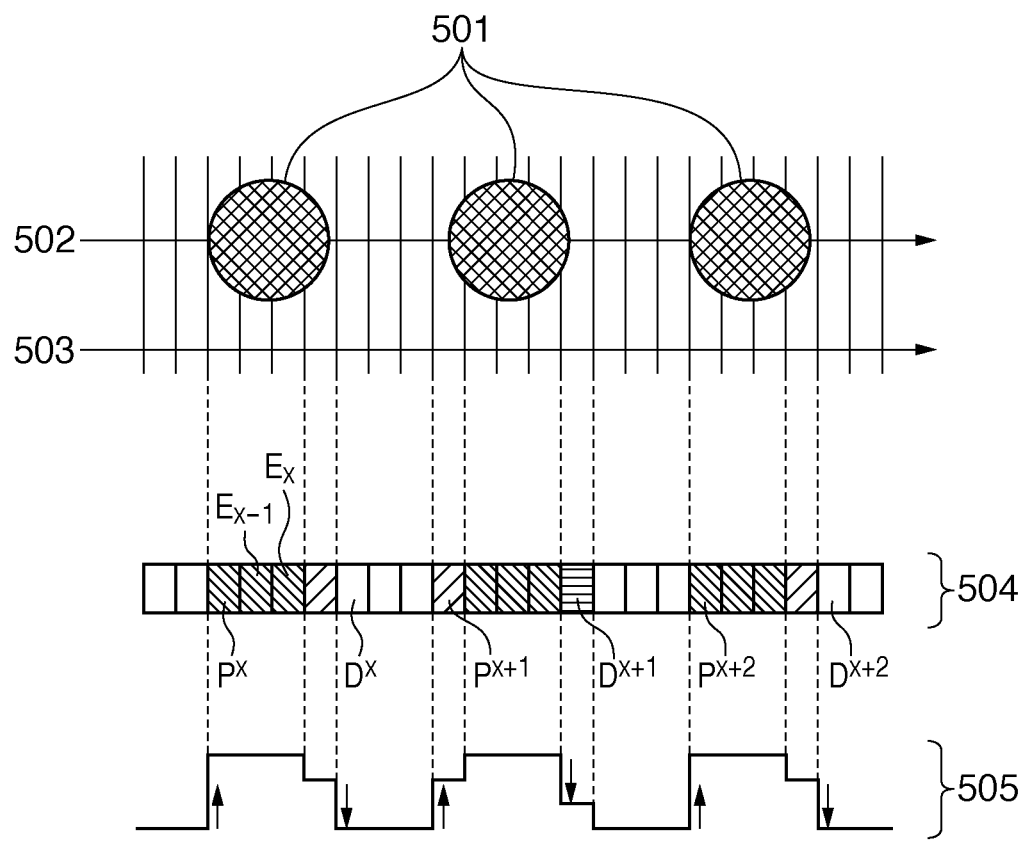
FIG. 4 is an exemplary view for explaining a feature pixel detecting method.

FIG. 4 is an exemplary view for explaining a feature pixel detecting method.

The process of detecting the first and second feature pixels (first detection and second detection) will be explained below with reference to FIGS. 3 and 4.

Assume that halftone dots 501 of an original are arranged along a read line 502 of the image reading apparatus as shown in FIG. 4. A line 503 is the next read line. The arrows of the read lines 502 and 503 indicate the read direction. The scanner 101 reads the original (particularly, the halftone dots 501), and the PC 221 performs image processing on the read image data at a predetermined resolution. As a consequence, image data 504 is obtained. Each pixel of the image data has a density value. FIG. 4 shows density values 505 corresponding to individual pixels of the image data.

In step S301, a difference between pixel values corresponding to the densities of a pixel of interest and neighboring pixel is calculated. Referring to FIG. 4, of pixels of the image data 504, the value of a pixel of interest $E_x$ and that of an immediately preceding neighboring pixel $E_{x-1}$ of the pixel of interest are compared.

Subsequently, in step S302, a predetermined threshold value is compared with the absolute value of the difference calculated in step S301. If the value of the pixel of interest is larger by at least a predetermined value than that of the neighboring pixel, the pixel of interest is detected as a peak pixel. Referring to FIG. 4, $P_x$, $P_{x+1}$ and $P_{x+2}$ represent peak pixels.

If the comparison result in step S302 shows that the absolute value of the level difference between the pixel values calculated in step S301 is larger than or equal to the predetermined threshold value, the pixel values of the pixel of interest and neighboring pixel are compared in step S303. If the value of the pixel of interest is larger than or equal to that of the neighboring pixel, the pixel of interest is detected as the first feature pixel in step S304. On the other hand, if the value of the pixel of interest is smaller than that of the neighboring pixel, the pixel of interest is detected as the second feature pixel in step S305.

Let $C_x$ be the density value of the pixel of interest $E_x$, $C_{x+1}$ be the density value of the immediately preceding neighboring pixel $E_{x-1}$ of the pixel of interest, and $V_{TH}$ be the predetermined threshold value. If it is discriminated, when the density values of these two pixels are compared, that the logical product of the discrimination conditions of expressions (1) and (3) holds, the pixel of interest $E_x$ is detected as the first feature pixel. If it is discriminated that the logical product of the discrimination conditions of expressions (2) and (3) holds, the pixel of interest $E_x$ is detected as the second feature pixel.

$$C_x \geq C_{x-1} \quad (1)$$

$$C_{x-1} > C_x \quad (2)$$

$$|C_x - C_{x-1}| \geq V_{TH} \quad (3)$$

Consequently, in the example shown in FIG. 4, $p^x$, $p^{x+1}$, and $p^{x+2}$ are detected as the first feature pixels, and $D^x$, $D^{x+1}$, and $D^{x+2}$ are detected as the second feature pixels.

Referring to FIG. 2A again, in step S205, the distance between the neighboring first feature pixels and the distance between the neighboring second feature pixels detected from the image data in steps S203 and S204 are respectively calculated as a first feature pixel to first feature pixel distance and second feature pixel to second feature pixel distance.

The process of calculating the first feature pixel to first feature pixel distance and second feature pixel to second feature pixel distance (first calculation and second calculation) will be explained below with reference to FIG. 5.

Figure 5:
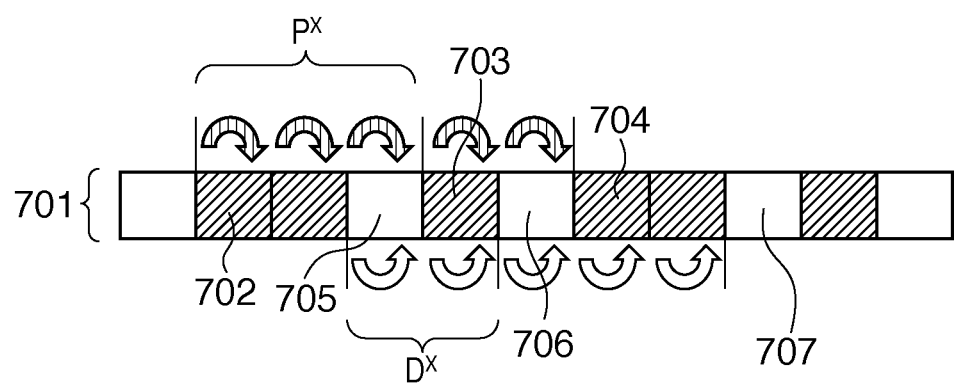
FIG. 5 is a view showing pixels in the line direction of image data obtained by reading an original.

FIG. 5 is a view showing pixels in the line direction of image data obtained by reading an original.

Referring to FIG. 5, reference numeral 701 denotes image data generated by reading a halftone dot portion of the original by using the scanner; 702 to 704, first feature pixels in the image data 701; and 705 to 707, second feature pixels in the image data 701.

In this embodiment, the number of pixels existing between neighboring first feature pixels is calculated as the first feature pixel to first feature pixel distance. For example, between the neighboring first feature pixels 703 and 704, provided that its own pixel (in this case pixel 703) is counted, two pixels, that is, the pixels 703 and 706 exist. Therefore, the first feature pixel to first feature pixel distance between the first feature pixels 703 and 704 is two pixels. Similarly, the number of pixels existing between neighboring second feature pixels is calculated as the second feature pixel to second feature pixel distance between these second feature pixels.

Referring to the example shown in FIG. 5, the feature pixel to feature pixel distance as the criterion of halftone original discrimination is as follows.

Three pixels exist between the first feature pixels 702 and 703, so the distance between these first feature pixels is three pixels. Likewise, the first feature pixel to first feature pixel distance between the first feature pixels 703 and 704 is two pixels. Also, the second feature pixel to second feature pixel distance between the second feature pixels 705 and 706 is two pixels, and that between the second feature pixels 706 and 707 is three pixels.

In the example shown in FIG. 5, the average of the first feature pixel to first feature pixel distance between the first feature pixels 702 and 703 and the second feature pixel to second feature pixel distance between the second feature pixels 705 and 706 is the feature pixel to feature pixel distance, and the value is 2.5 pixels. Similarly, the feature pixel to feature pixel distance calculated from the first feature pixel to first feature pixel distance between the first feature pixels 703 and 704 and the second feature pixel to second feature pixel distance between the second feature pixels 706 and 707 is 2.5 pixels.

In step S206, the feature pixel to feature pixel distance as the criterion of halftone original discrimination is calculated by using two distances, that is, the first feature pixel to first feature pixel distance and neighboring second feature pixel to second feature pixel distance calculated in step S205. This embodiment will be explained by assuming that an average value $(P^x + D^x)/2$ of the first feature pixel to first feature pixel distance $P^x$ and the neighboring second feature pixel to second feature pixel distance $D^x$ is the feature pixel to feature pixel distance [x].

Figure 6:
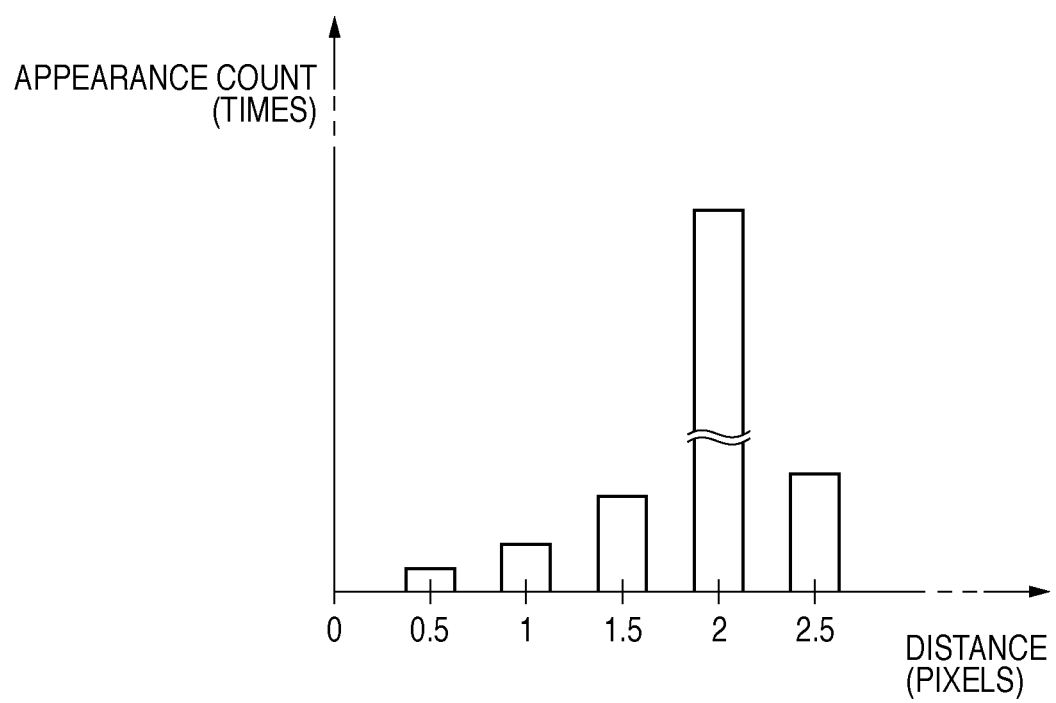
FIG. 6 is a histogram showing the appearance count of each feature pixel to feature pixel distance detected from the image data.

In step S207, the feature pixel to feature pixel distance [x] calculated in step S206 is compared with the feature pixel to feature pixel distance [x−1] calculated in step S206 in a preceding cycle. If [x]=[x−1], the process advances to step S208, and +1 is added to the appearance count of a distance corresponding to the feature pixel to feature pixel distance [x] in a histogram as shown in FIG. 6. In this manner, only a feature pixel to feature pixel distance having the same value in succession is regarded as an object of histogram formation (to be described later). After that, the process advances to step S209. On the other hand, if [x]≠[x−1], the process advances to step S209 to determine whether the pixel of interest x has reached the end pixel of the line.

If it is determined that the pixel of interest has reached the end pixel, the process advances to step S211; if not, the process advances to step S210 to move the pixel of interest to the next pixel, and returns to step S203 to repeat the above processing to the end pixel. The histogram shown in FIG. 6 is thus formed by performing the processing in steps S202 to S208 on all pixels of the image data of one line obtained in step S201.

When the histogram is complete, the process advances to step S211 to determine whether a distance exceeding a predetermined frequency (e.g., a distance having recorded an appearance count accounting for 20% of the appearance counts of all distances having appeared in the histogram) exists in the formed histogram. If the corresponding distance exists, the process advances to step S212 to discriminate that the read target original is a halftone original. On the other hand, if no corresponding distance exists, the process advances to step S213 to discriminate that the read target original is not a halftone original.

In the embodiment explained above, therefore, pixel to pixel distances having two different features are averaged, the average is defined as a feature pixel to feature pixel distance, and whether or not the read original is a halftone original is determined based on a histogram formed from a feature pixel to feature pixel distance having the same value in succession. Compared to the conventional discrimination based on the appearance frequency of a pixel to pixel distance having one specific feature, the number of features as objects of discrimination increases, and discrimination is performed based on the value of a stable pixel to pixel distance. This increases the discrimination accuracy because the discrimination is not greatly influenced by one feature or the read resolution.

[Second Embodiment]

The overall procedure of a halftone original discrimination process according to this embodiment is the same as that already explained with reference to the flowcharts shown in FIGS. 2A and 2B in the first embodiment, so a repetitive explanation will be omitted. In the second embodiment, the process of detecting first and second feature pixels and the process of calculating a first feature pixel to first feature pixel distance and second feature pixel to second feature pixel distance as the characteristic processes of this embodiment will be explained.

Figure 7:
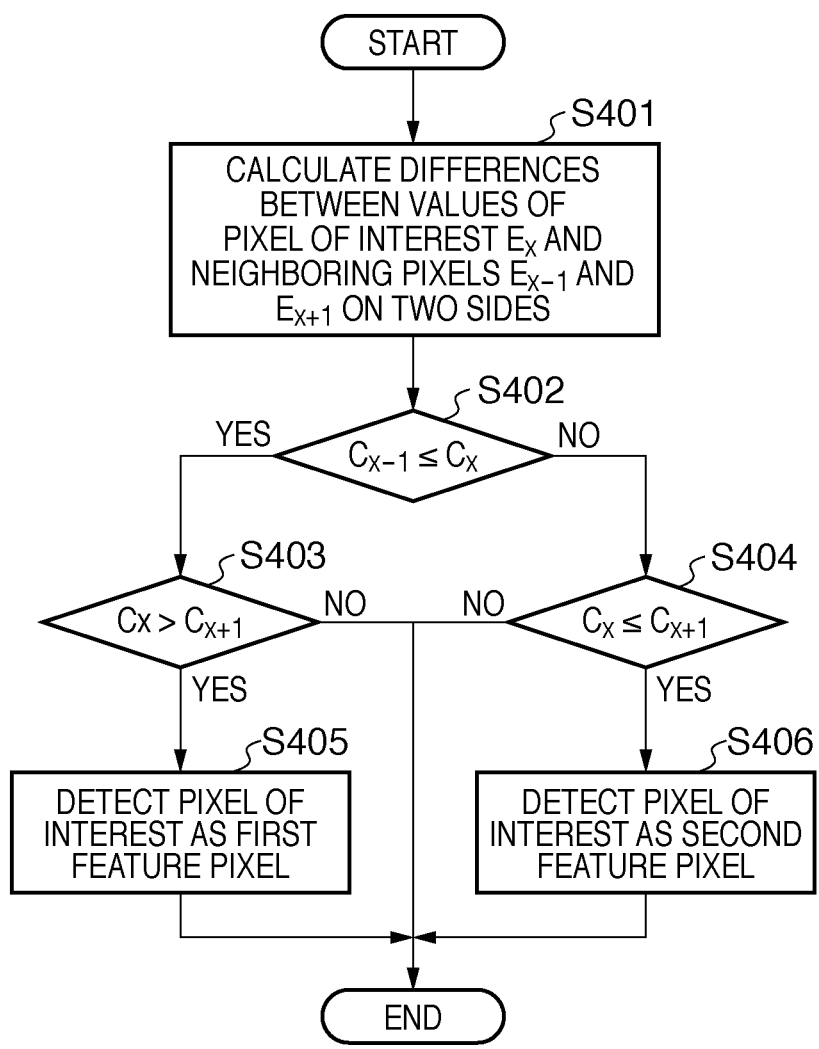
FIG. 7 is a flowchart showing the process of detecting first and second feature pixels according to the second embodiment of the present invention.

FIG. 7 is a flowchart showing the process of detecting the first and second feature pixels according to the second embodiment.

Figure 8:
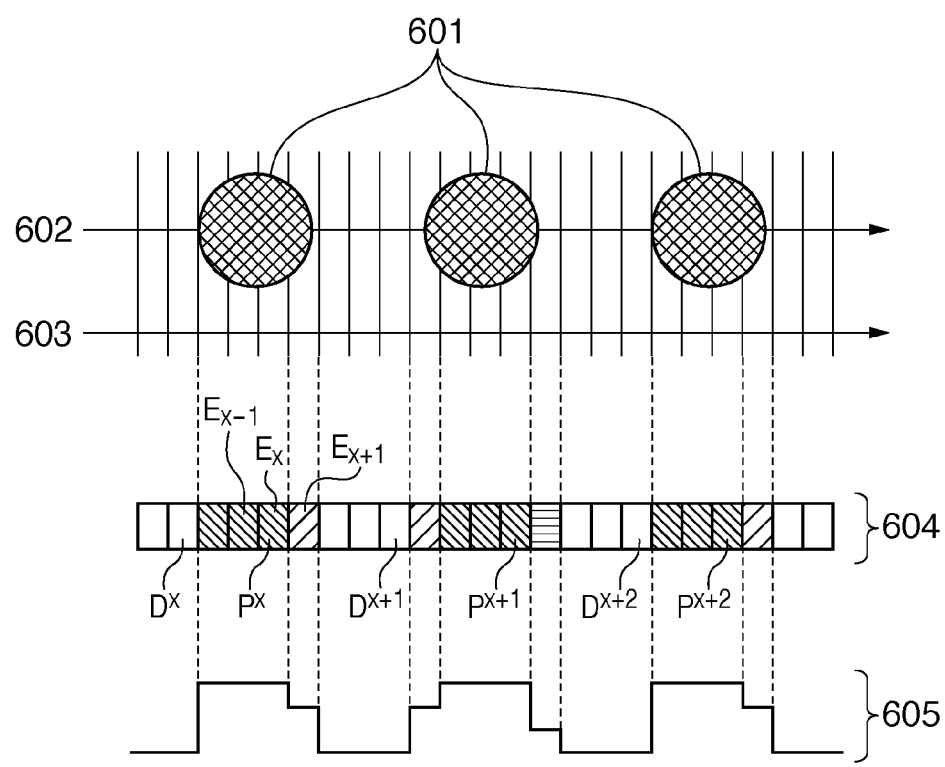
FIG. 8 is an exemplary view for explaining a feature pixel detecting method according to the second embodiment of the present invention.

FIG. 8 is an exemplary view for explaining a feature pixel detecting method according to the second embodiment.

The process of detecting the first and second feature pixels (first detection and second detection) will be explained below with reference to FIGS. 7 and 8.

Assume that halftone dots 601 of an original are arranged along a read line 602 of the image reading apparatus as shown in FIG. 8. A line 603 is the next read line. The arrows of the read lines 602 and 603 indicate the read direction. The scanner 101 reads the original (particularly, the halftone dots 601), and the PC 221 performs image processing on the read image data at a predetermined resolution. As a consequence, image data 604 is obtained. Each pixel of the image data has a density value. FIG. 8 shows density values 605 corresponding to individual pixels of the image data.

First, in step S401, a difference between pixel values corresponding to the densities of a pixel of interest $E_x$ and neighboring pixels $E_{x-1}$ and $E_{x+1}$ on the two sides of the pixel of interest $E_x$ is calculated. In step S402, whether the value of the pixel of interest $E_x$ is larger than or equal to that of the immediately preceding neighboring pixel $E_{x-1}$ is determined.

If the value of the pixel of interest $E_x$ is larger than or equal to that of the immediately preceding neighboring pixel $E_{x-1}$, the process advances to step S403. In step S403, whether the value of the pixel of interest $E_x$ is larger than that of the immediately succeeding neighboring pixel $E_{x+1}$ is determined. If it is discriminated in step S403 that the value of the pixel of interest $E_x$ is larger than that of the immediately succeeding neighboring pixel $E_{x+1}$, the process advances to step S405 to detect the pixel of interest as the first feature pixel.

On the other hand, if it is discriminated in step S402 that the value of the pixel of interest $E_x$ is smaller than that of the immediately preceding neighboring pixel $E_{x-1}$, the process advances to step S404. In step S404, whether the value of the pixel of interest $E_x$ is equal to or smaller than that of the immediately succeeding neighboring pixel $E_{x+1}$ is determined. If it is discriminated in step S404 that the value of the pixel of interest $E_x$ is equal to or smaller than that of the immediately succeeding neighboring pixel $E_{x+1}$, the process advances to step S406 to detect the pixel of interest as the second feature pixel.

Let $C_x$, $C_{x-1}$, and $C_{x+1}$ respectively be the density values of the pixel of interest $E_x$, immediately preceding neighboring pixel $E_{x-1}$, and immediately succeeding neighboring pixel $E_{x+1}$. If it is discriminated by the comparison of the values of the pixel of interest and two neighboring pixels that the logical product of the discrimination conditions of expressions (4) and (5) holds, the pixel of interest $E_x$ is detected as the first feature pixel. On the other hand, if it is discriminated that the logical product of the discrimination conditions of expressions (6) and (7) holds, the pixel of interest $E_x$ is detected as the second feature pixel.

The discrimination conditions are as follows.

$$C_x \geq C_{x-1} \quad (4)$$

$$C_x > C_{x+1} \quad (5)$$

$$C_x < C_{x-1} \quad (6)$$

$$C_x \leq C_{x+1} \quad (7)$$

Consequently, in the example shown in FIG. 8, $p^x$, $p^{x+1}$, and $p^{x+2}$ are detected as the first feature pixels, and $D^x$, $D^{x+1}$, and $D^{x+2}$ are detected as the second feature pixels.

The process of calculating a first feature pixel to first feature pixel distance and second feature pixel to second feature pixel distance (first calculation and second calculation) will be explained below with reference to FIG. 9.

Figure 9:
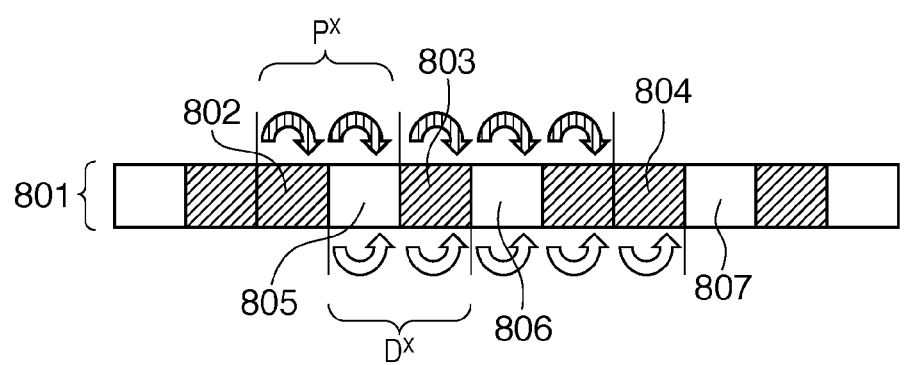
FIG. 9 is a view showing pixels in the line direction of image data obtained by reading an original.

FIG. 9 is a view showing pixels in the line direction of image data obtained by reading an original.

Referring to FIG. 9, reference numeral 801 denotes image data generated by reading a halftone dot portion of the original by using the scanner; 802 to 804, first feature pixels in the image data 801; and 805 to 807, second feature pixels in the image data 801.

In this embodiment, the number of pixels existing between neighboring first feature pixels is calculated as the first feature pixel to first feature pixel distance. For example, between the first feature pixel 802 and the neighboring first feature pixel 803, two pixels including the pixel 803, that is, the pixels 803 and 805 exist. Therefore, the first feature pixel to first feature pixel distance between the first feature pixels 802 and 803 is two pixels. Similarly, the number of pixels existing between neighboring second feature pixels is calculated as the second feature pixel to second feature pixel distance between these second feature pixels.

Referring to the example shown in FIG. 9, a feature pixel to feature pixel distance as the criterion of halftone original discrimination is as follows.

Two pixels exist between the first feature pixels 802 and 803, so the distance between these first feature pixels is two pixels. Likewise, the first feature pixel to first feature pixel distance between the first feature pixels 803 and 804 is three pixels. Also, the second feature pixel to second feature pixel distance between the second feature pixels 805 and 806 is two pixels, and that between the second feature pixels 806 and 807 is three pixels.

In the example shown in FIG. 8, the average of the first feature pixel to first feature pixel distance between the first feature pixels 802 and 803 and the second feature pixel to second feature pixel distance between the second feature pixels 805 and 806 is the feature pixel to feature pixel distance, and the value is two pixels. Similarly, the feature pixel to feature pixel distance calculated from the first feature pixel to first feature pixel distance between the first feature pixels 803 and 804 and the second feature pixel to second feature pixel distance between the second feature pixels 806 and 807 is three pixels.

In the embodiment explained above, therefore, pixel to pixel distances having two different features are averaged by checking the values of three consecutive pixels, the average is defined as the feature pixel to feature pixel distance, and whether or not the read original is a halftone original is determined based on a histogram formed from the distance.

Note that a CPU performs the various operations described above by executing program codes stored in a computer-readable recording medium such as a ROM.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-060113, filed Mar. 12, 2009, which is hereby incorporated by reference herein in its entirety.

What is claimed is:

1. An image reading method of reading an image of an original by an image reading apparatus, comprising:
    a comparing step of comparing a value of a pixel of interest with that of a neighboring pixel of the pixel of interest, the pixel of interest being each pixel in image data corresponding to pixels arranged in a predetermined direction of the original;
    a first detecting step of detecting, as a first feature pixel, a pixel of interest having a value exhibiting a first feature compared to the value of a neighboring pixel, based on the comparison result in the comparing step;
    a second detecting step of detecting, as a second feature pixel, a pixel of interest having a value exhibiting a second feature compared to the value of a neighboring pixel, based on the comparison result in the comparing step;
    a first calculating step of calculating a first feature pixel to first feature pixel distance between neighboring first feature pixels detected in the first detecting step;
    a second calculating step of calculating a second feature pixel to second feature pixel distance between neighboring second feature pixels detected in the second detecting step;
    a third calculating step of calculating a feature pixel to feature pixel distance based on the first feature pixel to first feature pixel distance and the second feature pixel to second feature pixel distance;
    a histogram generating step of generating, from the feature pixel to feature pixel distances calculated from all pixels arranged in the predetermined direction, a histogram of a feature pixel to feature pixel distance having the same value in succession;
    a discriminating step of discriminating whether or not a feature pixel to feature pixel distance exceeding a predetermined frequency exists in the histogram; and
    a determining step of determining whether or not the original is a halftone original, based on the discrimination result in the discriminating step.

2. The method according to claim 1, wherein in the first detecting step, an absolute value of a difference between the values of two pixels which are the pixel of interest and a neighboring pixel of the pixel of interest is compared with a predetermined threshold value, and the pixel of interest is detected as the first feature pixel in a case where the absolute value is larger than the predetermined threshold value, if the value of the pixel of interest is larger than or equal to that of the neighboring pixel.

3. The method according to claim 2, wherein in the second detecting step, the pixel of interest is detected as the second feature pixel if the value of the pixel of interest is smaller than that of the neighboring pixel.

4. The method according to claim 1, wherein in the first detecting step, the value of the pixel of interest is compared with that of an immediately preceding neighboring pixel of the pixel of interest in the predetermined direction, and the pixel of interest is detected as the first feature pixel in a case where the value of the pixel of interest is larger than or equal to that of the immediately preceding neighboring pixel, if the value of the pixel of interest is larger than that of an immediately succeeding neighboring pixel of the pixel of interest.

5. The method according to claim 4, wherein in the second detecting step, the value of the pixel of interest is compared with that of the immediately preceding neighboring pixel of the pixel of interest in the predetermined direction, and the pixel of interest is detected as the second feature pixel in a case where the value of the pixel of interest is smaller than that of the immediately preceding neighboring pixel, if the value of the pixel of interest is smaller than or equal to that of the immediately succeeding neighboring pixel of the pixel of interest.

6. The method according to claim 1, wherein in the third calculating step, an average value of the first feature pixel to first feature pixel distance and the second feature pixel to second feature pixel distance is calculated as the feature pixel to feature pixel distance.

7. A non-transitory computer-readable storage medium which stores a computer program for causing a computer to execute a method, said method comprising:

- a comparing step of comparing a value of a pixel of interest with that of a neighboring pixel of the pixel of interest, the pixel of interest being each pixel in image data corresponding to pixels arranged in a predetermined direction of an original;
- a first detecting step of detecting, as a first feature pixel, a pixel of interest having a value exhibiting a first feature compared to the value of a neighboring pixel, based on the comparison result in the comparing step;
- a second detecting step of detecting, as a second feature pixel, a pixel of interest having a value exhibiting a second feature compared to the value of a neighboring pixel, based on the comparison result in the comparing step;
- a first calculating step of calculating a first feature pixel to first feature pixel distance between neighboring first feature pixels detected in the first detecting step;
- a second calculating step of calculating a second feature pixel to second feature pixel distance between neighboring second feature pixels detected in the second detecting step;
- a third calculating step of calculating a feature pixel to feature pixel distance based on the first feature pixel to first feature pixel distance and the second feature pixel to second feature pixel distance;
- a histogram generating step of generating, from the feature pixel to feature pixel distances calculated from all pixels arranged in the predetermined direction, a histogram of a feature pixel to feature pixel distance having the same value in succession;
- a discriminating step of discriminating whether or not a feature pixel to feature pixel distance exceeding a predetermined frequency exists in the histogram; and
- a determining step of determining whether or not the original is a halftone original, based on the discrimination result in the discriminating step.

8. An image reading apparatus comprising:

- a scanner unit configured to read an image of an original;
- a comparison unit configured to compare a value of a pixel of interest with that of a neighboring pixel of the pixel of interest, the pixel of interest being each pixel in image data corresponding to pixels arranged in a predetermined direction of the original;
- a first detection unit configured to detect, as a first feature pixel, a pixel of interest having a value exhibiting a first feature compared to the value of a neighboring pixel, based on the comparison result from said comparison unit;
- a second detection unit configured to detect, as a second feature pixel, a pixel of interest having a value exhibiting a second feature compared to the value of a neighboring pixel, based on the comparison result from said comparison unit;
- a first calculation unit configured to calculate a first feature pixel to first feature pixel distance between neighboring first feature pixels detected by said first detection unit;
- a second calculation unit configured to calculate a second feature pixel to second feature pixel distance between neighboring second feature pixels detected by said second detection unit;
- a third calculation unit configured to calculate a feature pixel to feature pixel distance based on the first feature pixel to first feature pixel distance and the second feature pixel to second feature pixel distance;
- a histogram generation unit configured to generate, from the feature pixel to feature pixel distances calculated from all pixels arranged in the predetermined direction, a histogram of a feature pixel to feature pixel distance having the same value in succession;
- a discrimination unit configured to discriminate whether or not a feature pixel to feature pixel distance exceeding a predetermined frequency exists in the histogram; and
- a determination unit configured to determine whether or not the original is a halftone original, based on the discrimination result from said discrimination unit.

* * * * *